US012031664B2

(12) United States Patent
Wang

(10) Patent No.: US 12,031,664 B2
(45) Date of Patent: Jul. 9, 2024

(54) CURVATURE ADJUSTING APPARATUS, DISPLAY APPARATUS AND DISPLAY APPARATUS JIG

(71) Applicant: BOE TECHNOLOGY GROUP CO., LTD., Beijing (CN)

(72) Inventor: Zifeng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/914,338

(22) PCT Filed: Sep. 1, 2021

(86) PCT No.: PCT/CN2021/115941
§ 371 (c)(1),
(2) Date: Sep. 24, 2022

(87) PCT Pub. No.: WO2022/088950
PCT Pub. Date: May 5, 2022

(65) Prior Publication Data
US 2023/0122385 A1     Apr. 20, 2023

(30) Foreign Application Priority Data

Oct. 29, 2020   (CN) .......................... 202011182800.1

(51) Int. Cl.
*F16M 11/18* (2006.01)
*F16M 11/06* (2006.01)
*G09F 9/30* (2006.01)

(52) U.S. Cl.
CPC ............ *F16M 11/06* (2013.01); *F16M 11/18* (2013.01); *G09F 9/301* (2013.01)

(58) Field of Classification Search
CPC .......... F16M 11/06; F16M 11/18; G09F 9/301
(Continued)

(56) References Cited

U.S. PATENT DOCUMENTS 9,081,540 B1 * 7/2015 Cho ...................... G06F 1/1601
9,116,662 B1   8/2015 Song et al.
(Continued)

FOREIGN PATENT DOCUMENTS

CN        104639931 A    5/2015
CN        105023510 A   11/2015
(Continued)

*Primary Examiner* — Nkeisha Smith
(74) *Attorney, Agent, or Firm* — HOUTTEMAN LAW LLC

(57) ABSTRACT

The present disclosure relates to the field of display technology, and provides a curvature adjusting apparatus, a display apparatus and a display apparatus jig. The curvature adjusting apparatus is used for adjusting a curvature of a display surface of a flexible display substrate, and includes a rotating structure rotatable around a first rotation axis. The rotating structure is connected to the flexible display substrate and has a curved profile, The curved profile is used for supporting the flexible display substrate, and adjusting the curvature of the display surface of the flexible display substrate by driving the flexible display substrate to bend to different degrees when the rotating structure rotates around the first rotation axis. By applying the present disclosure, the structure is simple, and the curvature of the display surface of the flexible display substrate can be adjusted without other auxiliary tools.

17 Claims, 8 Drawing Sheets

(58) Field of Classification Search
USPC .................................. 248/176.3, 917–923
See application file for complete search history.

(56) References Cited

U.S. PATENT DOCUMENTS

| | | | |
|---|---|---|---|
| 9,311,843 B2 | 4/2016 | Kim et al. | |
| 9,980,399 B2* | 5/2018 | Cho | H05K 5/0017 |
| 11,098,788 B2 | 8/2021 | Chen | |
| 11,347,267 B2* | 5/2022 | Wolff | G06F 1/1601 |
| 11,630,635 B2* | 4/2023 | Cho | H04R 5/02 |
| | | | 381/152 |
| 11,700,701 B2* | 7/2023 | Zhang | G09F 13/0448 |
| | | | 361/807 |
| 11,749,138 B2* | 9/2023 | Park | G09F 9/301 |
| | | | 361/679.01 |
| 2015/0223358 A1 | 8/2015 | Nam et al. | |
| 2017/0105301 A1* | 4/2017 | Sun | H04N 5/64 |
| 2018/0033344 A1* | 2/2018 | Chen | G06F 1/1652 |
| 2018/0259160 A1 | 9/2018 | Chen et al. | |
| 2020/0323087 A1* | 10/2020 | Hwang | H05K 5/0247 |
| 2023/0030896 A1* | 2/2023 | Kim | G06F 1/1656 |
| 2023/0195406 A1* | 6/2023 | Cho | G02F 1/133314 |
| | | | 381/152 |
| 2023/0209742 A1* | 6/2023 | Cho | G09F 9/301 |
| | | | 361/807 |
| 2023/0209751 A1* | 6/2023 | Cho | G06F 1/1652 |
| | | | 361/807 |

FOREIGN PATENT DOCUMENTS

| | | |
|---|---|---|
| CN | 105681707 A | 6/2016 |
| CN | 106847096 A | 6/2017 |
| CN | 108230906 A | 6/2018 |
| CN | 110136591 A | 8/2019 |
| CN | 209880031 U | 12/2019 |

\* cited by examiner

CURVATURE ADJUSTING APPARATUS, DISPLAY APPARATUS AND DISPLAY APPARATUS JIG

TECHNICAL FIELD

The present disclosure relates to the technical field of display apparatus, and in particular to a curvature adjusting apparatus, a display apparatus and a display apparatus jig.

BACKGROUND

At present, Organic Light-Emitting Diode (hereinafter referred to as OLED) displays include flat displays and curved displays. A curved display (especially for a large-sized OLED display) is mainly fixed and bent at a curvature by a structural member, and then displaying is performed on the curved display.

In the related art, most of structural members each have a fixed curvature. The curved display formed by the structural members has only the fixed curvature. In addition, there are structural members of adjustable curvature. However, such structural members of adjustable curvature have a structure of relative complication, and usually an additional curvature jig is required to adjust the curvature of the curved display, resulting in complication of adjustment process.

SUMMARY

The present disclosure aims to solve at least one of the technical problems that exist in the related art, and provides a curvature adjusting apparatus, a display apparatus and a display apparatus jig, which have simple structures, and the curvature of the display surface of the flexible display substrate can be adjusted without other auxiliary tools.

In order to achieve the object of the present disclosure, a first aspect provides a curvature adjusting apparatus for adjusting a curvature of a display surface of a flexible display substrate, including a rotating structure rotatable around a first rotation axis, wherein the rotating structure is connected to the flexible display substrate and has a curved profile, the curved profile is used for supporting the flexible display substrate, and adjusting the curvature of the display surface of the flexible display substrate by driving the flexible display substrate to bend to different degrees when the rotating structure rotates around the first rotation axis.

Optionally, the rotating structure includes:
a curved rod, two ends of which is rotatably connected to the flexible display substrate, wherein the curved rod is bent to form the curved profile, and a connection line between the two ends of the curved rod serves as the first rotation axis; and
a limiting assembly, which is on the flexible display substrate and connected to the curved rod movably along a specified linear direction, to limit the curved rod and the flexible display substrate to bend synchronously, wherein the specified linear direction is parallel to the display surface of the flexible display substrate in a flat state.

Optionally, the limiting assembly includes at least one limiting member, the at least one limiting member is on the flexible display substrate and between the two ends of the curved rod, each of the at least one limiting member is provided with a limiting through slot, the limiting through slot extends along the specified linear direction, and the curved rod is inserted through the limiting through slot and is movable along the limiting through slot.

Optionally, ach of the at least one limiting member includes one or more first plates parallel to each other, and each of the one or more first plates is perpendicular to the display surface of the flexible display substrate in the flat state, and is provided with the limiting through slot.

Optionally, each of the at least one limiting member further includes a second plate, and a plurality of first plates parallel to each other are connected together by the second plate.

Optionally, each of the at least one limiting member further includes third plates, the number of the third plates is the same as that of the first plates, the third plates are connected to the first plates in a one-to-one correspondence manner, and the third plates are attached to the flexible display substrate and are fixedly connected to the flexible display substrate.

Optionally, the rotating structure further includes a length compensation assembly, the length compensation assembly includes two compensation rods, one end of each of the two compensation rods is connected to the flexible display substrate, and the other ends of the two compensation rods are retractably and rotatably connected to one of the two ends of the curved rod, respectively, to adjust a length of the curved rod.

Optionally, the length compensation assembly further includes two elastic members, each of the two elastic members is between the other end of one of the two compensation rods and one end of the curved rod, to apply an elastic force toward the compensation rod and the curved rod when being compressed.

Optionally, a connection groove is formed in each of the two ends of the curved rod, the elastic member is in the connection groove, and the other end of the compensation rod is inserted in the connection groove and abuts against the elastic member.

Optionally, the rotating structure further includes a fixing assembly, which includes two fixing members and two fastening screws, each of the two fixing member is fixedly connected to the flexible display substrate, a threaded hole is formed in the fixing member, a first through hole coaxial with the threaded hole is formed in each of the compensation rods, and the fastening screw passes through the first through hole and is threadedly connected to the threaded hole.

Optionally, the rotating structure further includes a guiding assembly, the guiding assembly is on the flexible display substrate and connected to the curved rod movably along the specified linear direction, to define a movement track of the curved rod in the specified linear direction.

Optionally, the guiding assembly includes at least one guide on the flexible display substrate and between the two ends of the curved rod, a guide groove extending in the specified linear direction is provided in the guide, and the curved rod is provided with a guide protrusion, which is slidably connected to the guide groove.

Optionally, the guiding assembly further includes a guide rod connected to the curved rod and extends in the specified linear direction to serve as the guide protrusion to be slidably connected to the guide groove.

Optionally, scale marks are provided on the guide along the specified linear direction, and scale values on the scale marks are in a one-to-one correspondence with curvature values of the display surface of the flexible display substrate.

Optionally, the guiding assembly further includes a handle, on the guide rod and fixedly connected to the curved rod for urging the curved rod to move.

Optionally, the curvature adjusting apparatus further includes a positioning structure on the flexible display substrate for fixing a position of the curved rod.

Optionally, the positioning structure includes a positioning screw, a threaded hole is provided in the guide rod, and the positioning screw is threadedly connected to the threaded hole, and limits the position of the curved rod by abutting against the guide groove.

Optionally, a plurality of the curved rods are arranged at intervals in a direction perpendicular to the first rotation axis;

in each of the at least one limiting member, a plurality of the limiting through slots are formed at intervals in the direction perpendicular to the first rotation axis, and the plurality of curved rods pass through the plurality of limiting through slots in a one-to-one correspondence manner; or, each of the at least one limiting member includes a plurality of limiting sub-members arranged at intervals in the direction perpendicular to the first rotation axis, the limiting through slot is arranged in each of the plurality of limiting sub-members, and the plurality of curved rods pass through the limiting through slots in the plurality of limiting sub-members in a one-to-one correspondence manner.

Optionally, the curved profile includes an arc shape or a wave shape including at least two arc segments.

The flexible display substrate includes a glass-based liquid crystal display panel, a flexible-based liquid crystal display panel, a glass-based OLED display panel, and a flexible-based OLED display panel, wherein the glass-based liquid crystal display panel and the glass-based OLED display panel have a curvature radius of 6500R to 800R in a bending state, and the flexible-based liquid crystal display panel and the flexible-based OLED display panel are adjustable from a flat state to a folded state in a plurality of bending states.

In order to achieve the object of the present disclosure, a second aspect provides a display apparatus, which includes a flexible display substrate and the curvature adjusting apparatus of the first aspect.

In order to achieve the object of the present disclosure, a third aspect provides a display apparatus jig including a flexible supporting plate and a curvature adjusting apparatus for adjusting the curvature of the flexible supporting plate, wherein the curvature adjusting apparatus includes a rotating structure rotatable around a first rotating axis, the rotating structure is connected to the flexible supporting plate and has a curved profile, the curved profile is used for supporting the flexible display substrate and adjusting the curvature of the flexible supporting plate by driving the flexible display plate to bend to different degrees when the rotating structure rotates around the first rotating axis.

The present disclosure has the following beneficial effects:

The curvature adjusting apparatus provided in the present disclosure includes a rotating structure rotatable around a first rotating axis, wherein the rotating structure is connected to the flexible display substrate and has a curve profile, the curve profile is used for supporting the flexible display substrate and adjusting the curvature of the display surface of the flexible display substrate by driving the flexible display substrate to bend to different degrees when the rotating structure rotates around the first rotation axis. In this way, as long as the rotating structure rotates, adjusting the curvature of the display surface of the flexible display substrate can be realized, an the overall structure is simple, other auxiliary tools are not required, installation and adjustment processes are more rapid and convenient, and the operation is easy.

In the display apparatus provided in the embodiment of the present disclosure, the curvature of the display surface of the flexible display substrate can be adjusted by adopting the curvature adjusting apparatus provided in the present disclosure, other auxiliary tools are not required, the installation and adjustment processes are more rapid and convenient, and the operation is easy.

In the display apparatus jig provided in the embodiment of the present disclosure, the curvature of the flexible supporting plate can be adjusted by adopting the curvature adjusting apparatus provided in the embodiment of the present disclosure, and the overall structure is simple, the installation and adjustment processes are more rapid and convenient, and the operation is easy.

DETAIL DESCRIPTION OF EMBODIMENTS

Figure 1A:
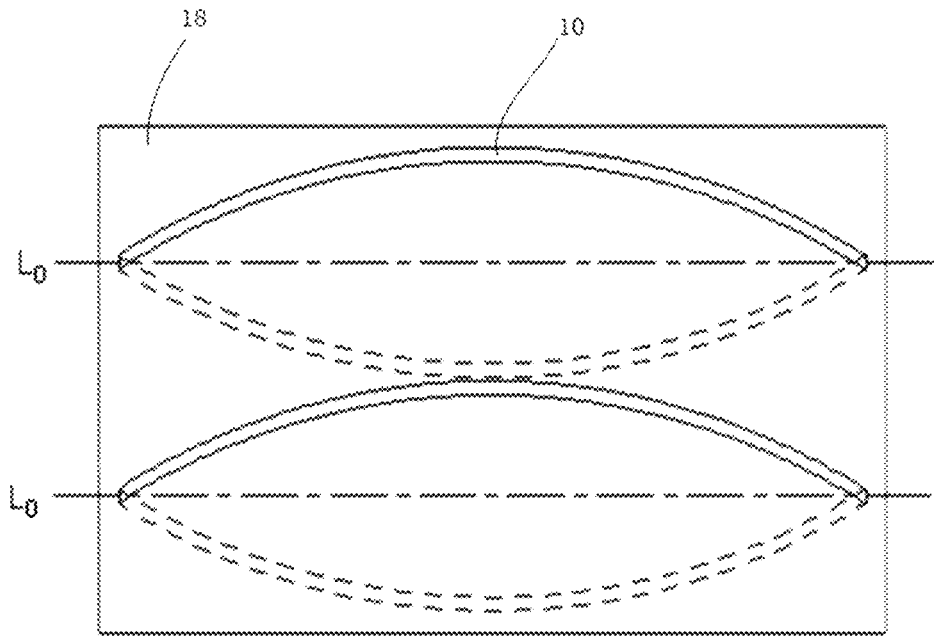
FIG. 1*a* is a schematic front view illustrating a structure of a curvature adjusting apparatus provided in an embodiment of the present disclosure when a flexible display substrate performs flat display.

The present disclosure is described in detail below, and examples of embodiments of the present disclosure are illustrated in the accompanying drawings, wherein same or similar reference numerals refer to same or similar elements or elements with a same or similar function throughout. In addition, a detailed description of the related art is omitted if it is unnecessary for the illustrated features of the present disclosure. The embodiments described below with reference to the accompanying drawings are exemplary and are only for explaining the present disclosure, but are not construed as limiting the present disclosure.

It will be understood by one of ordinary skill in the art that, unless otherwise defined, all terms (including technical and scientific terms) used herein have a same meaning as commonly understood by one of ordinary skill in the art to which the present disclosure belongs. It will be further understood that terms, such as those defined in commonly used dictionaries, should be interpreted as having a meaning that is consistent with their meaning in the context of the related art and will not be interpreted in an idealized or overly formal sense unless specifically defined as herein.

It will be understood by one of ordinary skill in the art that the singular forms "a", "an" and "the" as used herein are intended to include the plural forms as well, unless expressly stated otherwise. It will be understood that when an element is referred to as being "connected" or "coupled" to another element, it may be directly connected or coupled to the other element or intervening elements may also be present. Further, "connected" or "coupled" as used herein may include wirelessly connected or wirelessly coupled. As used herein, the term "and/or" includes all or any element and all combinations of one or more of the associated listed items.

The technical solution of the present disclosure and how the technical solution of the present disclosure solves the above-described technical problems will be described in detail below by specific embodiments with reference to the accompanying drawings.

Referring to FIG. 1a, the present embodiment provides a curvature adjusting apparatus for adjusting a curvature of a display surface of a flexible display substrate 18. The curvature adjusting apparatus includes a rotating structure rotatable around a first rotation axis L0. The rotating structure is connected to the flexible display substrate 18 and has a curved profile, i.e., the profile of the rotating structure is curved. The curved profile is used to support the flexible display substrate 18 and adjust the curvature of the display surface of the flexible display substrate 18 by bending the flexible display substrate 18 to different degrees when the rotating structure rotates around the first rotation axis L0. Therefore, as long as the rotating structure is rotated, the curvature of the display surface of the flexible display substrate 18 can be adjusted, the whole structure is simple, other auxiliary tools are not required, the installation and adjustment processes are more rapid and convenient, and the operation is easy.

There may be various rotating structures. For example, in the present embodiment, the rotating structure includes a curved rod 10, which is bent to form the curved profile, and two ends of the curved rod 10 are rotatably connected to the flexible display substrate 18, so that the curved rod 10 can rotate around a connection line between the two ends, which is the first rotation axis L0 described above. The first rotation axis L0 is, for example, parallel to the display surface of the flexible display substrate 18 in a flat state, but may have a certain included angle with respect to the display surface of the flexible display substrate 18 according to specific requirements in practical applications.

Figure 1B:
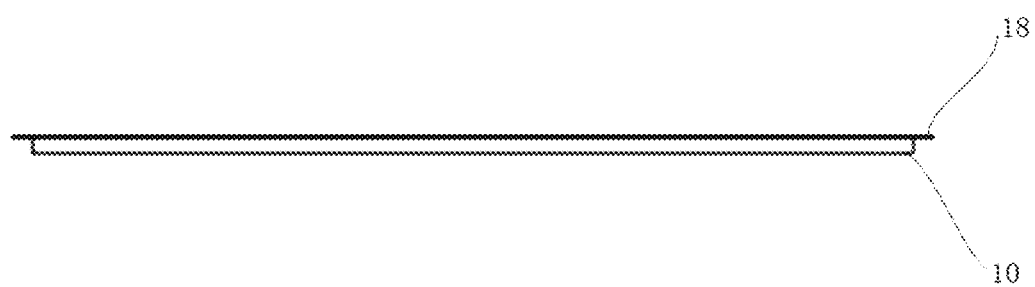
FIG. 1B is a schematic top view illustrating a structure of a curvature adjusting apparatus provided in an embodiment of the present disclosure when a flexible display substrate performs flat display.
Figure 2A:
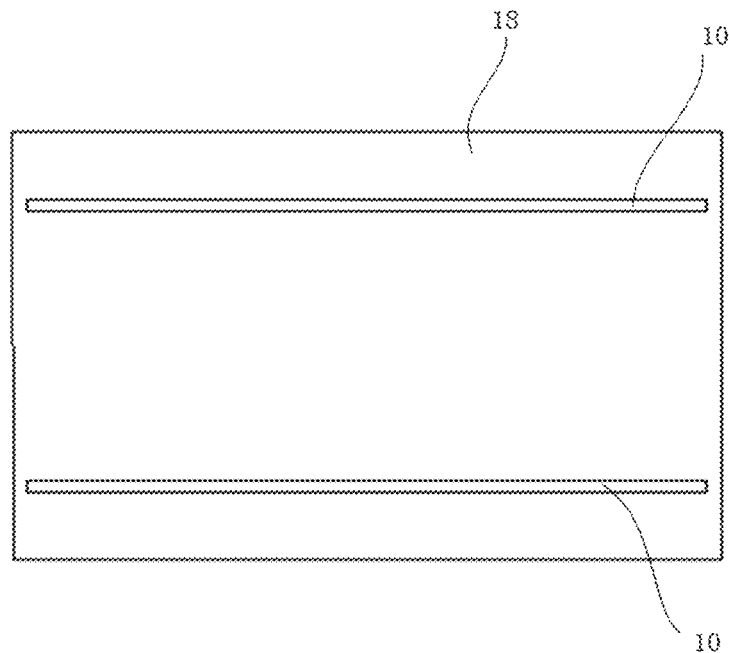
FIG. 2*a* is a schematic front view illustrating a structure of a curvature adjusting apparatus provided in an embodiment of the present disclosure when a flexible display substrate performs curved display.
Figure 2B:
FIG. 2*b* is a schematic top view illustrating a structure of a curvature adjusting apparatus provided in an embodiment of the present disclosure in a state that a flexible display substrate performs curved display.
Figure 2C:
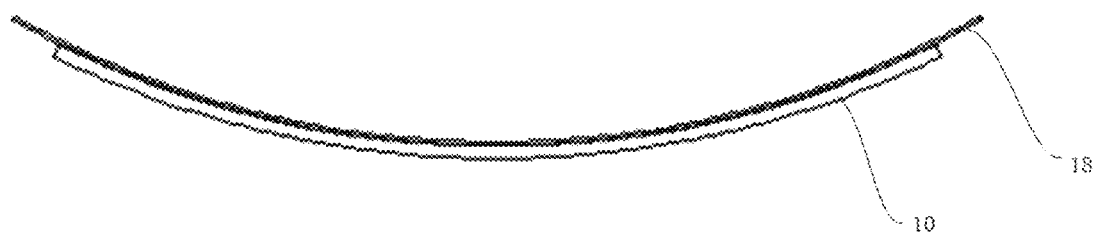
FIG. 2*c* is a schematic top view illustrating a structure of a curvature adjusting apparatus provided in an embodiment of the present disclosure in another state that a flexible display substrate performs curved display.

During the rotation of the curved rod 10 around the first rotation axis L0, the curved profile of the curved rod 10 always supports the flexible display substrate 18, and the curved profile will drive the flexible display substrate 18 to bend to different degrees as the spatial position of the curved profile is changed. For example, as shown in FIG. 1b, when the display surface of the flexible display substrate 18 is flat, a plane, where the curved profile of the curved rod 10 is located, is parallel to the display surface, that is, the curved profile of the curved rod 10 is located at a position shown by a solid line or a position shown by a dotted line in FIG. 1a. For another example, as shown in FIG. 2a, when the display surface of the flexible display substrate 18 is curved and has a largest curvature, the plane, where the curved profile of the curved rod 10 is located, is perpendicular to the display surface. As shown in FIG. 2b, when the display surface of the flexible display substrate 18 is convex, the curved profile of the curved rod 10 is close to the flexible display substrate 18 relative to the two ends of the curved rod 10. As shown in FIG. 2c, when the display surface of the flexible display substrate 18 is convex, the curved profile of the curved rod 10 is away from the flexible display substrate 18 relative to the two ends of the curved rod 10.

In practical applications, the flexible display substrate 18 may be any bendable display substrate, such as an OLED flexible display panel. A back plate is generally arranged on a back of the flexible display panel 18, and in order to prevent the curvature adjusting apparatus from affecting a display effect of the flexible display substrate 18, the curvature adjusting apparatus may be arranged on the back plate. That is, the rotating structure may be connected to the flexible display substrate 18 on a side of the flexible display substrate 18 away from the display surface (alternatively, without affecting display or with permission of other technologies, the rotating structure may be arranged on a side of the flexible display substrate 18 close to the display surface, which is not specifically required in this embodiment).

Figure 3:
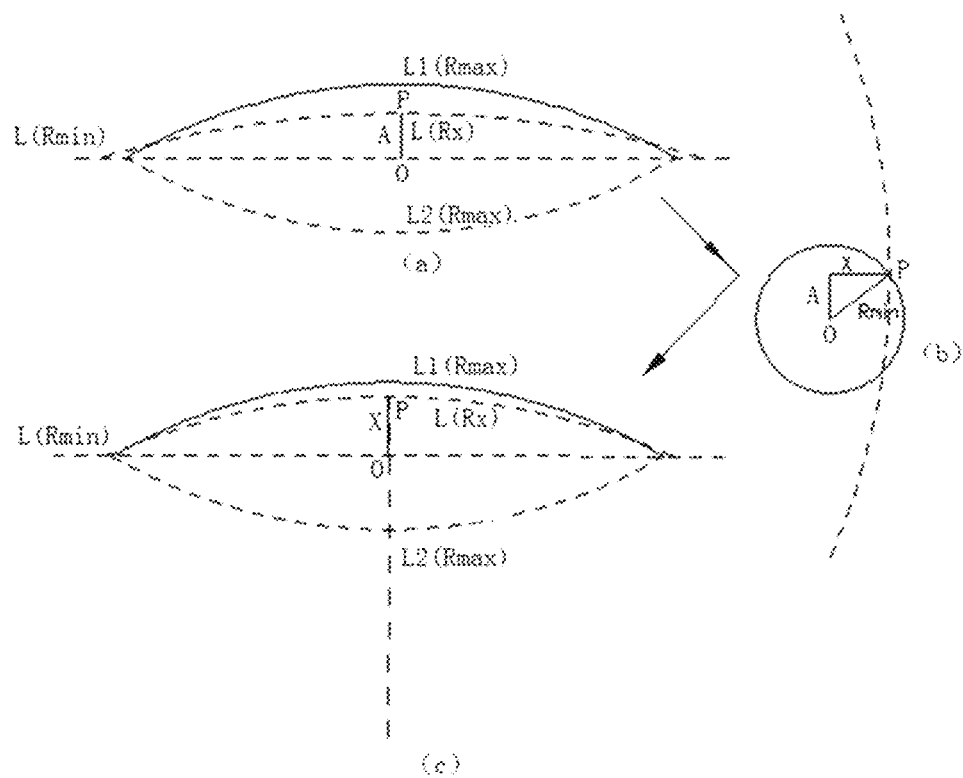
FIG. 3 is a schematic diagram illustrating a principle of adjusting a curvature of a display surface of a flexible display substrate through a curvature adjusting apparatus provided in an embodiment of the present disclosure.

A principle of curvature transformation of the curved rod 10 is described in detail below. Specifically, part (a) in FIG. 3 illustrates a rear view of the flexible display substrate 18 to indicate a current position of the curved profile of the curved rod 10; part (b) in FIG. 3 illustrates a curvature transformation circle, and part (c) in FIG. 3 illustrates an actual curvature of the display surface obtained after the current position of the curved profile of the curved rod 10 in part (a) is transformed by the curvature transformation circle in part (b).

A total length of a linear projection of the flexible display substrate 18 in a cross section, which is perpendicular to the display surface of the flexible display substrate 18 in a flat state, is constant. When the linear projection is a straight line, the display surface is flat; and when the linear projection is a curve line, the display surface is curved. As shown in part (a), the curved rod 10 has an infinite curvature radius Rmax at a position L1 and a position L2, and the display surface of the flexible display substrate 18 is flat. When the curved rod 10 is at a position L, the curved rod 10 has a corresponding minimum curvature radius Rmin, and in this case, the display surface of the flexible display substrate 18 is convex or concave, and a bending degree of the display surface is the maximum. The corresponding curvature radius of the curved rod 10 at any position L is denoted as Rx, and a connection line between a midpoint O of a connection line between two ends of the curved rod 10 and a midpoint P of the curved rod 10 at any position L(with a curvature radius of Rx) is dnoted as A.

In the curvature transformation circle shown in part (b), the minimum curvature radius Rmin is a radius of the curvature transformation circle, which corresponds to a hypotenuse of a triangle. One right-angle side of the triangle corresponds to the connection line A described above. Since the curved rod 10 is rigid, the minimum curvature radius Rmin is constant, so that a curvature depth X in part (c) corresponding to the other right-angle side of the triangle may be calculated. The curvature depth X is a connection line between the midpoint O of connection line and the midpoint P of the curved rod 10 at any position L(with a curvature radius of Rx), in a cross-section perpendicular to the display surface of the flexible display substrate 18 in a flat state. According to the curvature depth X and an arc length of the curved rod 10, the corresponding curvature radius Rx of the curved rod 10 at any position L can be calculated. In this way, when the curved rod 10 is rotated to different positions around the first rotation axis L0, the corresponding curvature radius can be calculated based on the above method, so that the curvature of the display surface of the flexible display substrate 18 can be accurately adjusted.

Figure 4:
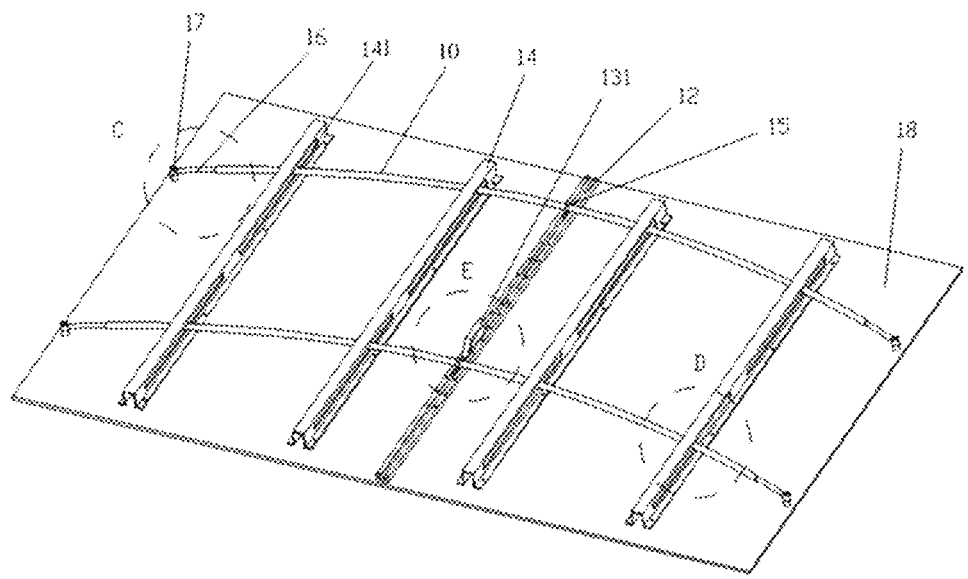
FIG. 4 is a schematic axonometric view illustrating a structure of another curvature adjusting apparatus provided in an embodiment of the present disclosure when a flexible display substrate performs flat display.

In order to ensure that the curved rod 10 always supports the flexible display substrate 18 during the curved rod 10 rotates around the first rotation axis L0, as shown in FIG. 4, the rotating structure further includes a limiting assembly arranged on the flexible display substrate 18 and connected to the curved rod 10 movably along a specified linear direction, to limit the curved rod 10 and the flexible display substrate 18 to bend synchronously. The specified linear direction is parallel to the display surface of the flexible display substrate 18 in flat state, for example, may be perpendicular to the first rotation axis L0.

A structure of the limiting assembly may be various, for example, as shown in FIG. 4, the limiting assembly may include a plurality of limiting members 14. The plurality of limiting members 14 are arranged on the flexible display substrate 18 and located between two ends of the curved rod 10. For example, FIG. 4 illustrates four limiting members 14, which are parallel to each other and evenly distributed on the back of the flexible display substrate 18. Alternatively, in practical applications, one limiting member 14 may be arranged according to specific requirements. Each limiting member 14 is provided with a limiting through slot 141, which extends along the specified linear direction described above. The curved rod 10 is inserted through the limiting through slot 141 and can move along the limiting through slot 141. In this way, the curved rod 10 may be limited to the back of flexible display substrate 18, ensuring that the curved rod 10 always supports the flexible display substrate 18, and when the curved rod 10 rotates, it moves along the limiting through slot 141 to realize a relative movement with the flexible display substrate 18.

Figure 5:
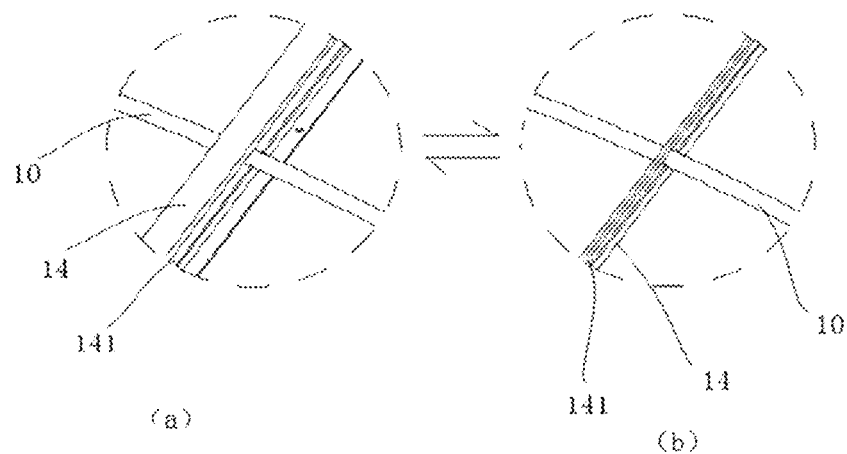
FIG. 5 is an enlarged view illustrating a structure at D in FIG. 4.

A structure of the limiting member 14 may also be various, for example, as shown in FIG. 5, a sectional shape of the limiting member 14 shown in part (a) is similar to a shape of "Π". Specifically, the limiting member 14 may include a plurality of first plates arranged in parallel, and the first plates are perpendicular to the display surface of the flexible display substrate 18 in the flat state. The limiting through slot 141 is correspondingly arranged in each first plate. By arranging a plurality of first plates, the limiting effect can be more firmly achieved, and the bending of the flexible display substrate 18 is more uniform. Alternatively, as shown in FIG. 5, the limiting member 14 shown in part (b) adopts only one first plate. That is, a sectional shape of the limiting member 14 shown is similar to a shape of "I", and the first plate is provided with a limiting through slot 141, which can also perform the limiting function; and at the same time, a whole structure of the flexible display substrate 18 can be simplified, and a manufacturing cost can be reduced. It should be noted that, in this embodiment, specific structures and materials of the first plate and a connection manner between the first plate and the flexible display substrate 18 are not particularly limited, as long as the function of limiting the curved rod 10 can be achieved.

Figure 6:
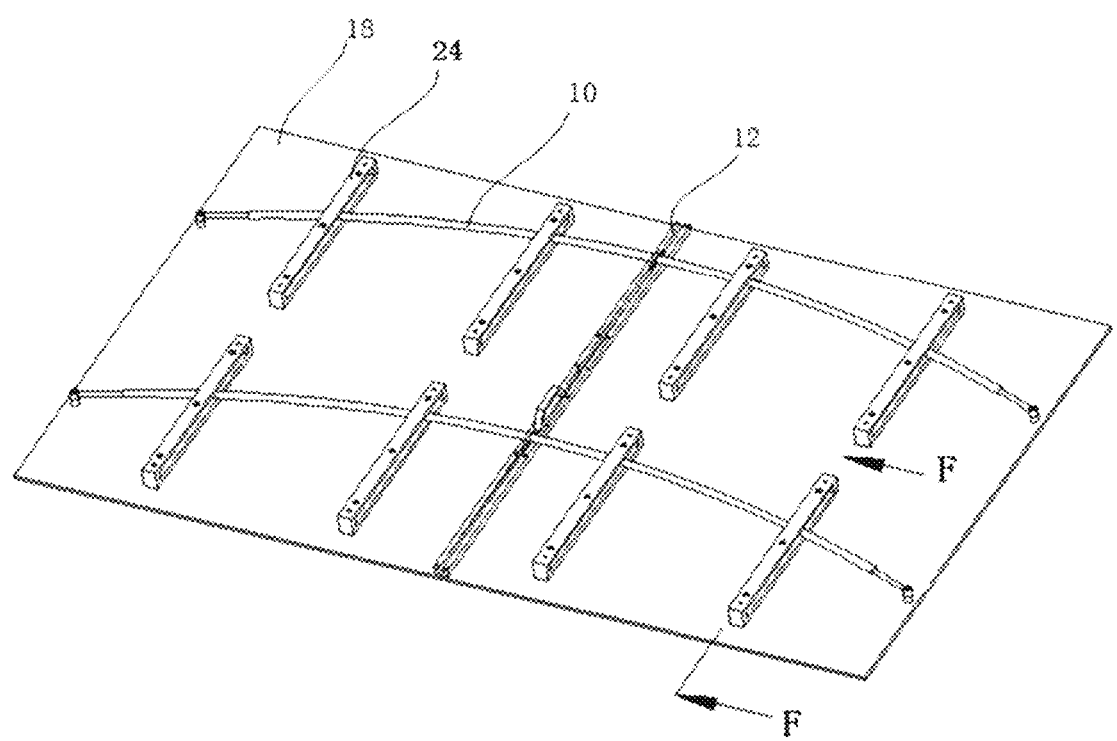
FIG. 6 is a schematic axonometric view illustrating a structure of another curvature adjusting apparatus provided in an embodiment of the present disclosure when a flexible display substrate performs flat display.
Figure 7:
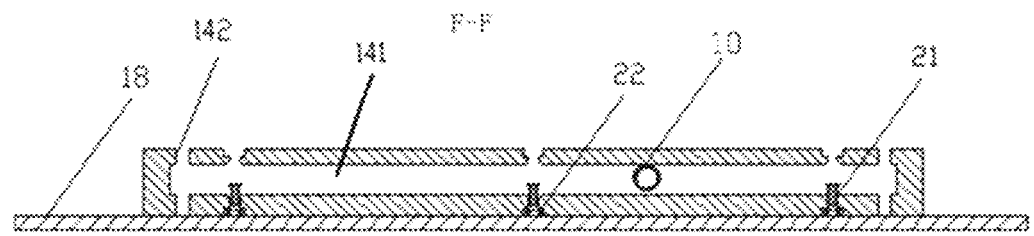
FIG. 7 is a sectional view taken along a line F-F in FIG. 6.

Further, the limiting member 14 may further include a second plate, and a plurality of first plates arranged in parallel may be connected together through the second plate. For example, where the limiting member 14 has two first plates and one second plate, an inverted "U" shape may be formed, so as to facilitate an overall installation and disassembly and enhance the mechanical strength of the limiting member 14. In addition, the limiting member 14 may further include third plates, the number of the third plates is the same as that of the first plates, and the third plates are connected to the first plates in a one-to-one correspondence manner. The third plates are attached to the flexible display substrate 18, and fixedly connected to the flexible display substrate 18. The third plates may be used as flangings of the first plates, and the first plates are fixedly connected to the flexible display substrate 18 through the flangings, so as to fix the limiting member 14. For example, the first plate and the third plate may form an "L"-shaped limiting member 14; and two first plates, one second plate, and two third plates may form a "π"-shaped limiting member 14. Specifically, as shown in FIGS. 6 and 7, the third plate may be provided with a threaded hole, and the third plate is fixedly connected to the flexible display substrate 18 through a fastening screw 21 and a nut 22 fixed on the flexible display substrate 18. Alternatively, a plurality of threaded holes may be formed in the first plate located above, so that the first plate may be used as the third plate to be fixedly connected to the flexible display substrate 18. Alternatively, a connection hole 142 (which may be a threaded hole) may be formed at the end of the limiting member 14 for connecting the whole product to an external scene.

An engaging manner between the curved rod 10 and the limiting member 14 may be various, for example, a plurality of curved rods 10 may be provided and arranged at intervals along a direction perpendicular to the first rotation axis L0. As shown in FIG. 4, a plurality of limiting through slots 141 are provided in each limiting member 14 at intervals in a direction perpendicular to the first rotation axis L0, and the curved rods 10 are inserted into the limiting through slots 141 in a one-to-one correspondence manner, so that a large limiting member 14 can be shared by the plurality of curved rods 10, and the overall installation and disassembly of the limiting member 14 can be facilitated. As shown in FIG. 6, each limiting member 14 may include a plurality of limiting sub-members 24 arranged at intervals in a direction perpendicular to the first rotation axis L0. A limiting through slot 141 is provided in each limiting sub-member 24, and the curved rods 10 are inserted into the limiting through slots 141 in the limiting sub-members 24 in a one-to-one correspondence manner, so that each curved rod 10 corresponds to a corresponding limiting sub-member 24, the position of the limiting sub-member 24 can be flexibly set, the curved rods 10 can be better limited, and the maintenance and replacement of the limiting assembly are facilitated, and especially when the limiting sub-members 24 are required to be replaced, the maintenance cost can be reduced.

Figure 8:
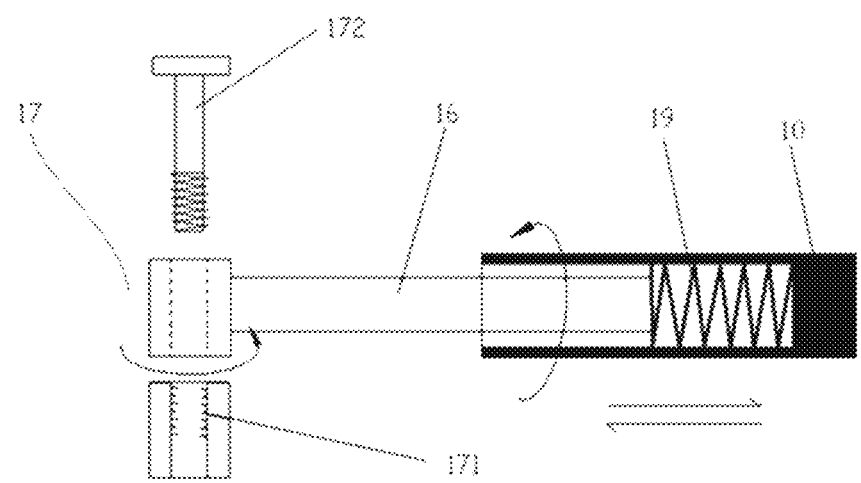
FIG. 8 is an enlarged view illustrating a structure at C in FIG. 4.

During the curved rod 10 rotates around the first rotation axis L0, the positions of the two ends of the curved rod 10 slightly change. In order to prevent the change from affecting the display of the flexible display substrate 18, as shown in FIGS. 4 and 8, the rotating structure may further include a length compensation assembly, which may include two compensation rods 16. One ends of the two compensation rods 16 each are connected to the flexible display substrate 18, and the other ends of the two compensation rods 16 is retractably and rotatably connected to the two ends of the curved rod 10 respectively, for adjusting a length of the curved rod 10 (i.e., a sum of the lengths of the curved rod 10 and of the extending portions of the two compensation rods 16), so as to prevent a misalignment and displacement from occurring between the layers of the flexible display substrate 18 during the flexible display substrate 18 is bent and performs curved display.

Further, the length compensation assembly may further include two elastic members 19, each of the elastic members 19 is arranged between the other end of each of compensation rods 16 and one end of the curved rod 10, to apply an elastic force toward the compensation rod 16 and the curved rod 10 when being compressed. Thus, the elastic member 19 is arranged between the compensation rod 16 and the curved rod 10, so that when the curved rod 10 rotates, if the ends of the curved rod 10 are relatively misaligned, elastic expansion and contraction between the curved rod 10 and the compensation rod 16 may be achieved by elastic expansion and contraction of the elastic members 19, to compensate for the curved rod 10.

A connection groove may be formed at each of the two ends of the curved rod 10, and the elastic member 19 may be arranged in the connection groove. The other end of the compensation rod 16 may be inserted in the connection groove to abut against the elastic member 19. In this way, placing the elastic member 19 in the connection groove can limit the position of the elastic member 19, so as to prevent the elastic member 19 from shaking or even failing in elasticity after being subjected to the force of the curved rod 10.

It should be noted that the present embodiment does not specifically limit the specific structure and arrangement of the elastic member 19, as long as it can achieve elastic expansion and contraction between the curved rod 10 and the compensation rod 16. For example, the elastic member 19 may be a coil spring, a gas spring, a hydraulic cylinder, or the like.

In order to better mount the compensation rod 16 on the flexible display substrate 18, as shown in FIGS. 4 and 8, the rotating structure may further include a fixing assembly 17. As shown in FIG. 8, the fixing assembly 17 may include two fixing members 171 and two fastening screws 172. Each fixing member 171 is fixedly connected to the flexible display substrate 18, a threaded hole is provided in the fixing member 171, a first through hole coaxial with the threaded hole is provided in each compensation rod 16, and the fastening screw 172 passes through the first through hole and is threadedly connected to the threaded hole. In this way, the first through hole is provided in the compensation rod 16, and the fastening screw 172 passes through the first through hole, to realize loose fit between the first through hole and the fastening screw 172, such that the compensation rod 16 can rotate around the fastening screw 172, thereby converting the rotation of the rotating structure during that the curvature is adjusted into a rotation between the curved rod 10 and the compensation rod 16 and a rotation between the compensation rod 16 and the fastening screw 172, so that the rotation of the curved rod 10 is smoother.

It should be noted that the structure of the above fixing assembly 17 is only one embodiment of the present embodiment, and the present embodiment is not limited thereto as long as the rotatable connection between the compensation rod 16 and the flexible display substrate 18 can be realized. For example, the compensation rod 16 may be directly hinged via a hinge, or pivoted via a pin to the flexible display substrate 18.

Figure 9:
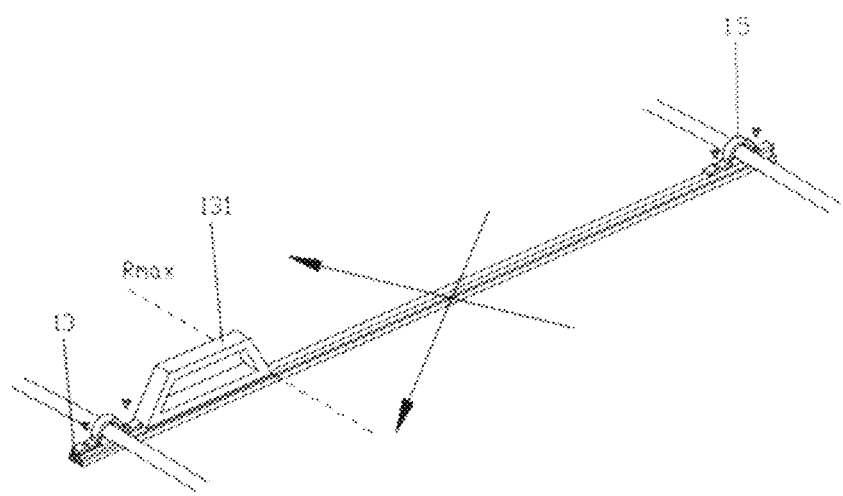
FIG. 9 is an enlarged view illustrating a structure at E in FIG. 4.
Figure 9A:
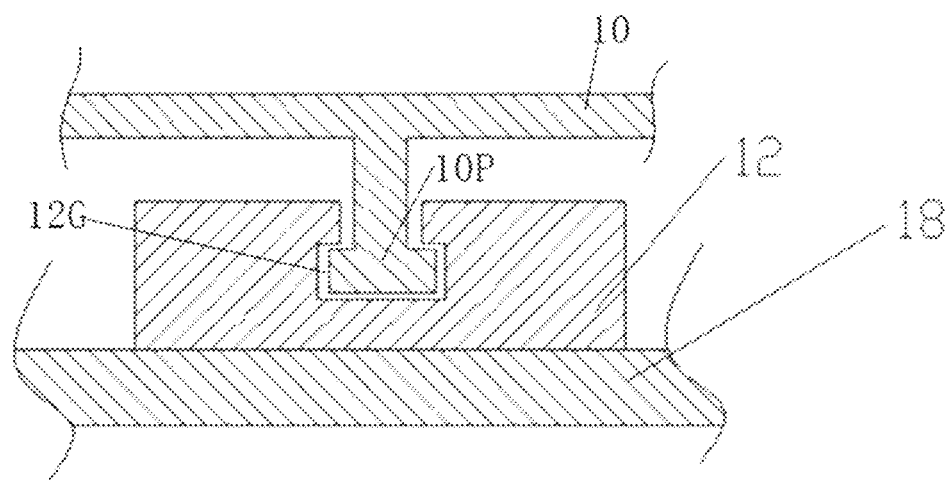
FIG. 9A is a schematic diagram illustrating a guide groove and a guide protrusion provided in an embodiment of the present disclosure.

As shown in FIGS. 4 and 9, in order to stabilize the movement of the curved rod 10, the rotating structure may further include a guiding assembly, which may be arranged on the flexible display substrate 18 and connected to the curved rod 10 movably along a specified linear direction, to define a movement track of the curved rod 10 along the specified linear direction, so that the curved rod 10 can continuously move along the specified linear direction during that the curved rod 10 rotates around the first rotation axis, thereby continuously and stably adjusting the curvature of the display surface of the flexible display substrate 18.

The guiding assembly may include at least one guide 12. The guide 12 may be arranged on the flexible display substrate 18 and located between two ends of the curved rod 10. A guide groove extending along a specified linear direction is arranged in the guide 12, the curved rod 10 is provided with a guide protrusion 10P, which is slidably connected to the guide groove 12G, and the guide protrusion 10P and the guide groove 12G cooperate to enable the curved rod 10 to move along the guide groove 12G of the guide 12, so as to guide the curved rod 10 by the guide 12 and limit a movement track of the curved rod 10 in the specified linear direction. Specifically, where there is only one guide 12, the guide 12 may be arranged in an intermediate position of the curved rod 10; and where there are a plurality of guides 12, the plurality of guides 12 may be spaced apart from each other uniformly along the length of the curved rod 10, and may be spaced apart from and arranged alternately with the limiting members 14.

In another specific embodiment of this embodiment, in order to determine the curvature value of the specific display surface of the flexible display substrate 18 when the curved rod 10 is at a certain position, scale marks may be provided on the guide 12 along the specified linear direction. Scale values of the scale marks are in a one-to-one correspondence with curvature values of the display surface of the flexible display substrate 18, so as to directly read and determine the curvature value of the specific display surface of the flexible display substrate 18 when the curved rod 10 is at a certain position. According to the principle of the curved rod 10 for adjusting the curvature of the display surface, the curvature height A may correspond to the actual curvature radius Rx in a one-to-one correspondence manner. The curvature height A is a value along a specified linear direction, which is parallel to the surface of the flexible display substrate 18 performing flat display, and may be directly marked on the flexible display substrate 18. Therefore, the curvature height A may be marked on the guide 12, or directly on the flexible display substrate 18 through a corresponding scale. Alternatively, instead of the value of the curvature height A, the corresponding actual curvature radius Rx is calculated during manufacturing and directly marked, so as to directly read the actual curvature radius Rx of the flexible display substrate 18 at the current position. Specifically, when the position of the curved rod 10 is fixed, the scale value corresponding to the central axis of the curved rod 10 may be read to determine the actual curvature radius Rx of the flexible display substrate 18 when the curved rod 10 is at the current position.

In another embodiment of this embodiment, in order to better cooperate with the guide 12, the guiding assembly may further include a guide rod 13. The guide rod 13 may be connected to the curved rod 10 and extends along the specified linear direction to serve as the guide protrusion to be slidably connected to the guide groove 12G. In this way, by providing a separate guide rod 13, both the guide rod 13 and the guide groove 12G extend along the specified linear direction, when the guide rod 13 is slidably connected to the guide groove 12G, a contact area between the guide rod 13 and the guide groove 12G may be increased, which is more favorable for the guide rod 13 to move in the guide groove 12G, thereby making the cooperation and relative movement between the curved rod 10 and the guide 12 more stable, and further facilitating the guiding of the movement of the curved rod 10 in the specified linear direction. Further, the replacement and maintenance of the guide rod 13 are convenient, and the service life of the curved rod 10 and of the rotating structure can be prolonged. Specifically, the guide rods 13 may be fixedly connected to the curved rod 10 by a connecting member 15. The connecting member 15 may have a "Ω" shape as shown in FIG. 9, the curved rod 10 may be arranged in the concave of the "Ω" shape, and the connecting member 15 may be fixedly connected to the guide rods 13 by flangings at two ends of the "Ω" shape. In order to increase the contact area between the guide rod 13 and the guide groove 12G and enhance the guiding effect, the guide rod 13 may be set to be a T-shape, an I-shape, or the like. In order to facilitate the movement of the guide rod 13 in the guide groove 12G, the portion of the guide rod 13 contacting with the guide groove 12G may be formed in a spherical or a hemispherical shape.

It should be noted that the structures of the guide 12 and of the guide rod 13 described above is only one specific embodiment of the present embodiment, and the present embodiment is not limited to this. For example, a slide rail may be arranged on the guide 12, and a guide groove may be arranged in the curved rod 10 or in the guide rod 13.

In another embodiment of the present invention, as shown in FIGS. 4 and 9, the guiding assembly may further include a handle 131. The handle 131 may be arranged on the guide rod 13 and fixedly connected to the curved rod 10 for urging the curved rod 10 to move, so that when the curvature of the display surface of the flexible display substrate 18 is required to be adjusted, the handle 131 may be pushed, to push or pull the guide rod 13 obliquely upward or obliquely downward with respect to the specified linear direction described above (as shown by an arrow in FIG. 9), and further drive the curved rod 10 to move and rotate together. During the rotation process of the curved rod 10, a corresponding Rx value marked by a scale mark on the guide 12 may be matched, to adjust the curved rod 10 to a proper position, thereby adjusting the curvature of the display surface of the flexible display substrate 18 to a desired value, and achieving the purpose of automatically adjusting the curvature of the display surface of the flexible display substrate 18 during rotation of the curved rod 10. Through pushing or pulling the guide rod 13 obliquely upward with respect to the specified linear direction described above, the flexible display substrate 18 can be lifted upward, so that the display surface of the flexible display substrate 18 is a concave surface. Through pushing or pulling the guide rod 13 obliquely downward with respect to the specified linear direction described above, the flexible display substrate 18 can be lifted downward, so that the display surface of the flexible display substrate 18 is convex. In addition, in FIG. 4, only one handle 131 is shown, and in practical applications, each curved rod 10 may be correspondingly provided with one handle 131.

Further, the position of the curved rod 10 may be determined by the handle 131. Specifically, an end surface of the handle 131 in the specified straight direction described above may have an intersection line with the guide 12, and the intersection line is parallel to the scale mark. The intersection line may be set to correspond to a starting point of the bend, i.e., the Rmax scale when the flexible display substrate 18 performs flat display.

In another embodiment of this embodiment, in order to stably fix the flexible display substrate 18 at a certain position, the curvature adjusting apparatus may further include a positioning structure, which may be arranged on the flexible display substrate 18 and used for fixing the position of the curved rod 10. In this way, during the rotation of the curved rod 10, the position of the handle 131 may be observed while rotating the curved rod 10. When the curvature of the display surface at the corresponding position of the handle 131 reaches a desired value, the current position of the curved rod 10 may be fixed by the positioning structure, so that the flexible display substrate 18 may be stably fixed at the current position, thereby obtaining a stable curvature of the display surface.

Figure 10:
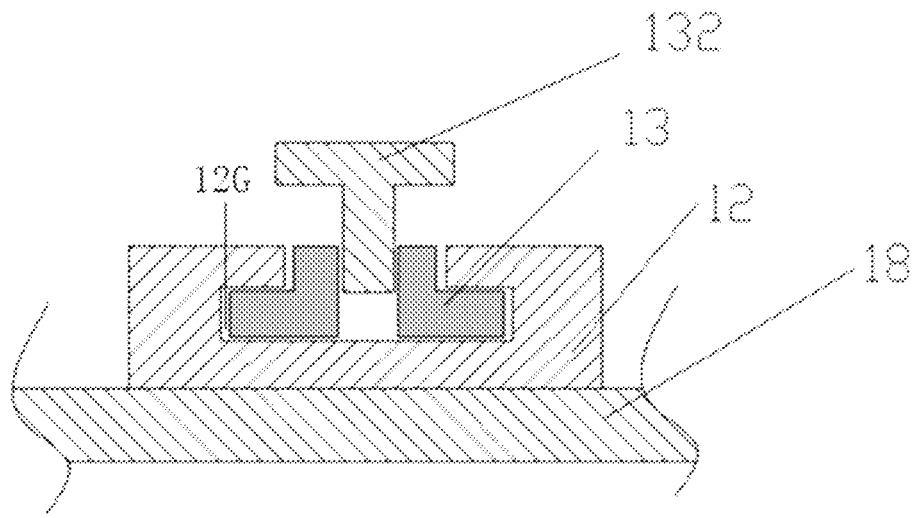
FIG. 10 is a schematic diagram illustrating a positioning structure provided in an embodiment of the present disclosure.

As shown in FIG. 10, the positioning structure may include a positioning screw 132. A threaded hole is provided in the guide rod 13, and the positioning screw 132 is threadedly connected to the threaded hole and limits the position of the curved rod 10 by abutting against the guide groove 12G. In this way, the guide rod 13 can be fixed at any position of the guide groove 12G by the arrangement of the positioning screw 132 and the threaded hole, thereby fixing the guide rod 13 and then fixing the position of the curved rod 10 fixedly connected to the guide rod 13. It should be noted that this positioning structure is only a specific implemantation of the present embodiment, and the present embodiment is not limited to this. For example, a "π"-shaped pressing member may be provided, and when the curved rod 10 moves to a target position, the "π"-shaped pressing member may be fixed on the flexible display substrate 18 by the flangings at two ends of the pressing member, and presses the curved rod 10 tightly.

It should be noted that, the above-described rotating structure including the curved rod 10 and the limiting assembly is only an implementation of the present embodiment, and the present embodiment is not limited to this. For example, the rotating structure may alternatively include one or more eccentric rotating members, and when the eccentric rotating member rotates eccentrically, the supporting position of the eccentric rotating member on the flexible display substrate 18 is changed, so that the flexible display substrate 18 has a same curved profile as the eccentric rotating member at the supporting position, thereby realizing synchronous bending of the flexible display substrate 18 and the eccentric rotating member, and the curvature of the display surface of the flexible display substrate 18 can be adjusted.

Figure 11:
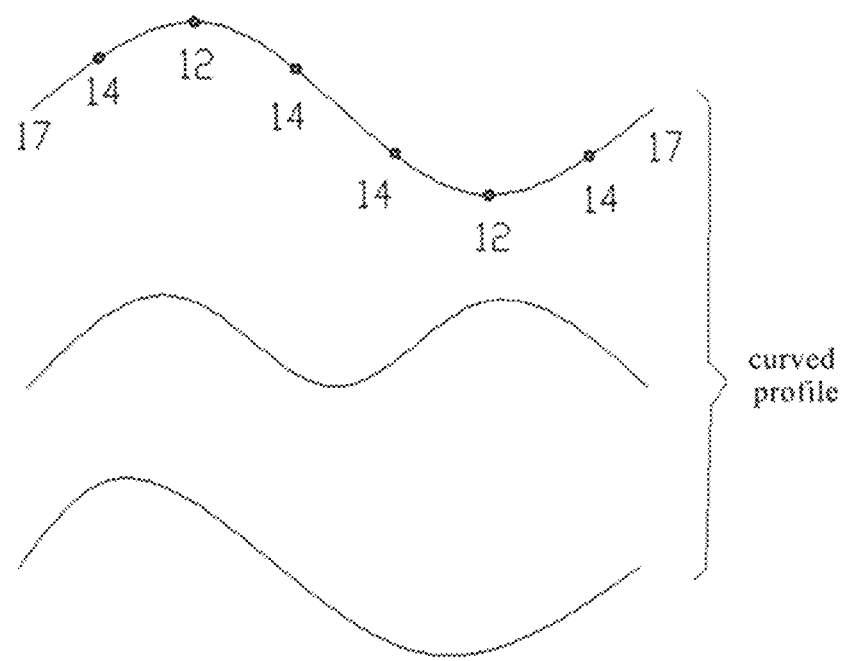
FIG. 11 is a schematic diagram illustrating a curved profile of a rotating structure provided in an embodiment of the present disclosure.
Figure 12:
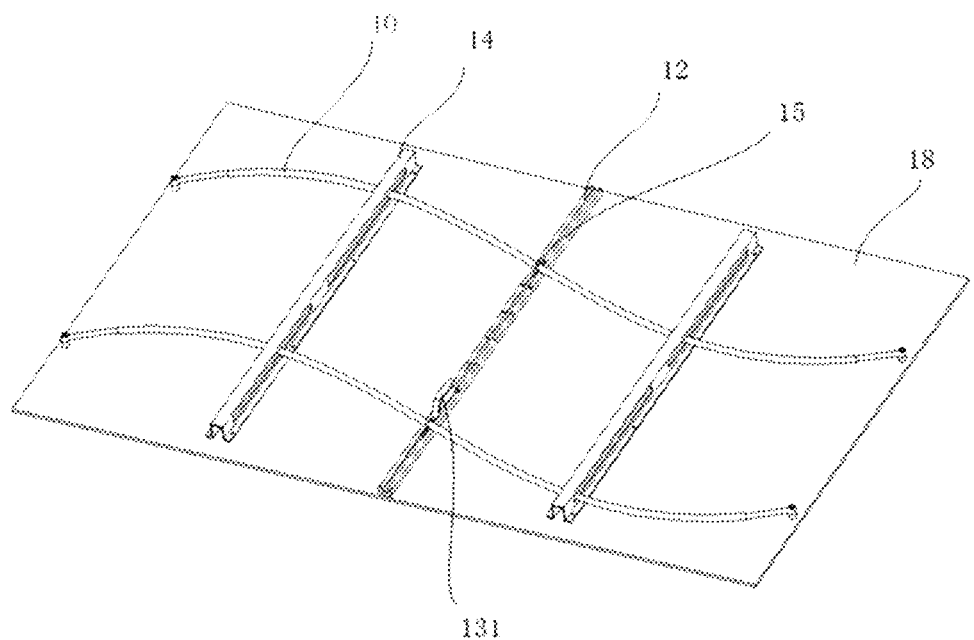
FIG. 12 is a schematic axonometric view illustrating a structure of another curvature adjusting apparatus provided in an embodiment of the present disclosure when a flexible display substrate is performs flat display.

In addition, the present embodiment does not specifically limit the specific shape of the curved profile of the curved rod 10 and the specific structure of the limiting assembly, as long as the curved rod 10 and the limiting assembly are matched to drive the flexible display substrate 18 to bend, so as to adjust the curvature of the display surface of the flexible display substrate 18. For example, as shown in FIGS. 11 and 12, the curved profile may include an arc shape or a wave shape (e.g., a symmetrical or asymmetrical S-shape) composed of at least two arc segments, and the like, which are well suited for the individual splicing display. The flexible display substrate 18 may be converted, through rotating the curved rod 10, into an S-shaped display screen, or an asymmetric wavy display screen, etc. by changing the shape of the curved profile of the curved rod 10.

When the curvature adjusting apparatus described above is assembled, the following processes may be referred to. Firstly, a plurality of guides 12 and a plurality of limiting members 14 are mounted to a flexible display substrate 18 on a side of the flexible display substrate 18 away from a display surface according to specified positions. Then, a guide rod 13 is guided into a proper position in a guide groove 12G of the guide 12. Then, a curved rod 10 passes through all the limiting members 14 and is placed on the guide rod 13, and is fixed to the guide rod 13 through a connecting member 15 and a fixing screw. Then, an elastic member 19 is placed in a connecting groove at the end of the curved rod 10, and one end of a compensation rod 16 is connected to the flexible display substrate 18 through a fixing member 171 and a fastening screw 172, and the other end of the compensation rod 16 is inserted into the connecting groove. The specified positions may be defined with reference to the specific positions of the guide 12 and the limiting member 14 as described above. For the wave-shaped curved rod 10 including a plurality of arc segments, the guide 12 and the guide rod 13 may be fixed at the peaks and valleys of the wave shape to facilitate formation of the corresponding wave-shaped curved surface. Between two guides 12 adjacent to each other, the number of the limiting members 14 may be set according to actual requirements. Meanwhile, a depth of the peak and the valley in the waveform, i.e., a distance between two guides 12 adjacent to each other, depends on the minimum bending radius that the flexible display substrate 18 (display screen) can bear.

Based on the same concept of the curvature adjusting apparatus, the present embodiment further provides a display apparatus, which includes the flexible display substrate 18 and a curvature adjusting apparatus, wherein the curvature adjusting apparatus is the curvature adjusting apparatus in any one of the above embodiments.

The display apparatus provided in this embodiment includes the flexible display substrate 18 and a curvature adjusting apparatus which can automatically adjust the curvature of the display surface of the flexible display substrate 18. The curvature adjusting apparatus includes a rotating structure rotatable around a first rotation axis L0, and the rotating structure is connected to the flexible display substrate 18 and has a curved profile. The curved profile is used for supporting the flexible display substrate 18, and adjusting the curvature of the display surface of the flexible display substrate 18 by driving the flexible display substrate 18 to bend to different degrees when the rotating structure rotates around the first rotation axis L0. In this way, the curvature of the display surface of the display apparatus can be automatically adjusted by rotating the rotating structure. Other auxiliary tools are not required, the installation and adjustment processes are more rapid and convenient, and the operation is easy.

Based on the same concept of the curvature adjusting apparatus, the present embodiment further provides a display apparatus jig, which includes a flexible supporting plate and a curvature adjusting apparatus for adjusting the curvature of the flexible supporting plate. The curvature adjusting apparatus includes a rotating structure rotatable around a first rotation axis L0, the rotating structure is connected to the flexible supporting plate and has a curved profile. The curved profile is used for supporting the flexible supporting plate, and adjusting the curvature of the flexible supporting plate by driving the flexible supporting plate to bend to different degrees when the rotating structure rotates around the first rotation axis L0.

The flexible display substrate involved in the above technical solution includes a glass-based liquid crystal display panel, a flexible-based liquid crystal display panel, a glass-based OLED display panel and a flexible-based OLED display panel. Due to the difference of the structure of the display panel and the difference of the substrate materials, the bending curvatures of the four display panels are different from each other. The flexibility of the flexible-based OLED display panel is greater than that of the flexible-base liquid crystal display panel. The flexibility of the flexible-based liquid crystal display panel is greater than that of the glass-based OLED display panel. The flexibility of the glass-based OLED display panel is greater than that of the glass-based liquid crystal display panel. The bending curvature, i.e., the curvature radius, of the glass-based display panel is in a range of 6500R (the curved surface radius is 6.5 m) to 800R (the curved surface radius is 0.8 m), and the typical values used in experimental verification are 3000R (the curved surface radius is 3 m) and 2500R (the curved surface radius is 2.5 m). The flexible-based display panel can realize various bending adjustments from a flat state to a folded state.

The display apparatus jig provided in this embodiment includes a flexible supporting plate and a curvature adjusting apparatus. The curvature adjusting apparatus includes a rotating structure rotatable around a first rotating axis L0. The rotating structure is connected to the flexible supporting plate and has a curved profile. The curved profile is used for supporting a flexible display substrate, and adjusting the curvature of the flexible supporting plate by driving the flexible supporting plate to bend to different degrees when the rotating structure rotates around the first rotating axis L0, and the flexible supporting plates with different curvatures can be obtained, so that the display apparatus jig can be applied to various types of flexible display apparatuses, the universality of the display apparatus jig is improved, and the overall manufacturing cost is reduced. Other auxiliary tools are not required, the installation and adjustment processes are more rapid and convenient, and the operation is easy.

One of ordinary skill in the art will understand that various operations, methods, steps in the flow, measures, schemes discussed in the present disclosure may be alternated, modified, combined, or deleted.

In the description of the present disclosure, it is to be understood that an orientation or a positional relationship indicated by the term "center", "upper", "lower", "front", "rear", "left", "right", "vertical", "horizontal", "top", "bottom", "inner", "outer", or the like is an orientation or a positional relationship based on those shown in the drawings, merely for convenience of describing the present disclosure and simplifying the description, but does not indicate or imply that the apparatus or element referred to must have a particular orientation, be constructed and operated in a particular orientation, and therefore should not be construed as limiting the present disclosure.

The above are only a part of embodiments of the present disclosure. It should be noted that one of ordinary skill in the art may make various improvements and modifications without departing from the principle of the present disclosure, and these improvements and modifications should also be considered as within the protection scope of the present disclosure.

What is claimed is:

1. A curvature adjusting apparatus for adjusting a curvature of a display surface of a flexible display substrate, comprising a rotating structure rotatable around a first rotation axis, wherein the rotating structure is configured to be capable of being connected to the flexible display substrate and has a curved profile; and the curved profile is used for supporting the flexible display substrate, and adjusting the curvature of the display surface of the flexible display substrate by driving the flexible display substrate to bend to different degrees when the rotating structure rotates around the first rotation axis, wherein the rotating structure comprises:
a curved rod, two ends of which is rotatably are each configured to be capable of being rotatably connected to the flexible display substrate, wherein the curved rod is bent to form the curved profile, and a connection line between the two ends of the curved rod serves as the first rotation axis; and
a limiting assembly, which is configured to be capable of being placed on the flexible display substrate and is connected to the curved rod movably along a specified linear direction, to limit the curved rod and the flexible display substrate to bend synchronously, wherein the specified linear direction is parallel to the display surface of the flexible display substrate in a flat state,
wherein the rotating structure further comprises a length compensation assembly, the length compensation assembly comprises two compensation rods, one end of each of the two compensation rods is configured to be capable of being connected to the flexible display substrate, and other ends of the two compensation rods are retractably and rotatably connected to the two ends of the curved rod, respectively, to adjust a length of the curved rod,
wherein the length compensation assembly further comprises two elastic members, each of the two elastic members is between the other end of one of the two compensation rods and one end of the curved rod, to apply an elastic force toward the compensation rod and the curved rod when being compressed.

2. The curvature adjusting apparatus according to claim 1, wherein the limiting assembly comprises at least one limiting member, the at least one limiting member is configured to be capable of being placed on the flexible display substrate and is between the two ends of the curved rod, each of the at least one limiting member is provided with a limiting through slot, the limiting through slot extends along the specified linear direction, and the curved rod is inserted through the limiting through slot and is movable along the limiting through slot.

3. The curvature adjusting apparatus according to claim 2, wherein the limiting member comprises one or more first plates; and
each of the one or more first plates is configured to be capable of being arranged perpendicular to the display surface of the flexible display substrate in the flat state, and is provided with the limiting through slot.

4. The curvature adjusting apparatus according to claim 3, wherein the limiting member further comprises a second plate, the limiting member comprises a plurality of first plates parallel to each other, and the plurality of first plates parallel to each other are connected together by the second plate.

5. The curvature adjusting apparatus according to claim 3, wherein the limiting member further comprises one or more third plates, the number of the third plates is the same as that of the first plates, the third plates are connected to the first plates in a one-to-one correspondence manner, and the third plates are each configured to be capable of being attached to the flexible display substrate and are each configured to be capable of being fixedly connected to the flexible display substrate.

6. The curvature adjusting apparatus according to claim 2, wherein a plurality of the curved rods are arranged at intervals in a direction perpendicular to the first rotation axis;
in each of the at least one limiting member, a plurality of the limiting through slots are formed at intervals in the direction perpendicular to the first rotation axis, and the plurality of curved rods pass through the plurality of limiting through slots in a one-to-one correspondence manner; or
each of the at least one limiting member comprises a plurality of limiting sub-members arranged at intervals in the direction perpendicular to the first rotation axis, the limiting through slot is arranged in each of the plurality of limiting sub-members, and the plurality of curved rods pass through the limiting through slots in the plurality of limiting sub-members in a one-to-one correspondence manner.

7. The curvature adjusting apparatus according to claim 1, wherein a connection groove is formed in each of the two ends of the curved rod, the elastic member is in the connection groove, and the other end of the compensation rod is inserted in the connection groove and abuts against the elastic member.

8. The curvature adjusting apparatus according to claim 1, wherein the rotating structure further comprises a fixing assembly comprising two fixing members and two fastening screws, each of the two fixing member is configured to be capable of being fixedly connected to the flexible display substrate, a threaded hole is formed in the fixing member, a first through hole coaxial with the threaded hole is formed in the compensation rod, and the fastening screw passes through the first through hole and is connected to the threaded hole.

9. The curvature adjusting apparatus according to claim 1, wherein the rotating structure further comprises a guiding assembly, the guiding assembly is configured to be capable of being placed on the flexible display substrate and is connected to the curved rod movably along the specified linear direction, to define a movement track of the curved rod in the specified linear direction.

10. The curvature adjusting apparatus according to claim 9, wherein the guiding assembly comprises at least one guide, the at least one guide is configured to be capable of being placed on the flexible display substrate and is between the two ends of the curved rod, a guide groove extending in the specified linear direction is provided in the guide, and the curved rod is provided with a guide protrusion slidably connected to the guide groove.

11. The curvature adjusting apparatus according to claim 10, wherein the guiding assembly further comprises a guide rod, the guide rod is connected to the curved rod and extends in the specified linear direction to serve as the guide protrusion to be slidably connected to the guide groove.

12. The curvature adjusting apparatus according to claim 11, wherein scale marks are provided on the guide along the specified linear direction, and scale values on the scale marks are in a one-to-one correspondence with curvature values of the display surface of the flexible display substrate.

13. The curvature adjusting apparatus according to claim 12, wherein the guiding assembly further comprises a handle, and the handle is on the guide rod and fixedly connected to the curved rod for urging the curved rod to move.

14. The curvature adjusting apparatus according to claim 11, further comprising a positioning structure, and the positioning structure is configured to be capable of being placed on the flexible display substrate for fixing a position of the curved rod.

15. The curvature adjusting apparatus according to claim 14, wherein the positioning structure comprises a positioning screw, a threaded hole is provided in the guide rod, and the positioning screw is threadedly connected to the threaded hole and limits the position of the curved rod by abutting against the guide groove.

16. A display apparatus, comprising a flexible display substrate and the curvature adjusting apparatus according to claim 1.

17. A display apparatus jig, comprising a flexible supporting plate and a curvature adjusting apparatus for adjusting the curvature of the flexible supporting plate, wherein the curvature adjusting apparatus comprises a rotating structure rotatable around a first rotating axis, the rotating structure is connected to the flexible supporting plate and has a curved profile, the curved profile is used for supporting the flexible supporting plate and adjusting a curvature of the flexible supporting plate by driving the flexible supporting plate to bend when the rotating structure rotates around the first rotating axis, wherein the rotating structure comprises:

a curved rod, two ends of which is rotatably are each rotatably connected to the flexible supporting plate, wherein the curved rod is bent to form the curved profile, and a connection line between the two ends of the curved rod serves as the first rotation axis; and a limiting assembly, which is on the flexible supporting plate and is connected to the curved rod movably along a specified linear direction, to limit the curved rod and the flexible supporting plate to bend synchronously, wherein the specified linear direction is parallel to the display surface of the flexible supporting plate in a flat state, wherein the rotating structure further comprises a length compensation assembly, the length compensation assembly comprises two compensation rods, one end of each of the two compensation rods is connected to the flexible supporting plate, and other ends of the two compensation rods are retractably and rotatably connected to the two ends of the curved rod, respectively, to adjust a length of the curved rod, wherein the length compensation assembly further comprises two elastic members, each of the two elastic members is between the other end of one of the two compensation rods and one end of the curved rod, to apply an elastic force toward the compensation rod and the curved rod when being compressed.

* * * * *